United States Patent
Iwasa et al.

(10) Patent No.: US 8,093,178 B2
(45) Date of Patent: Jan. 10, 2012

(54) CATALYST FOR REDUCING CARBON MONOXIDE CONCENTRATION

(75) Inventors: Yasuyuki Iwasa, Yokohama (JP); Takaya Matsumoto, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 43 days.

(21) Appl. No.: 12/520,127

(22) PCT Filed: Dec. 17, 2007

(86) PCT No.: PCT/JP2007/074614
§ 371 (c)(1),
(2), (4) Date: Jun. 19, 2009

(87) PCT Pub. No.: WO2008/075761
PCT Pub. Date: Jun. 26, 2008

(65) Prior Publication Data
US 2010/0086814 A1    Apr. 8, 2010

(30) Foreign Application Priority Data

Dec. 20, 2006   (JP) ................................. 2006-342846

(51) Int. Cl.
| | |
|---|---|
| B01J 23/00 | (2006.01) |
| B01J 23/40 | (2006.01) |
| B01J 23/42 | (2006.01) |
| B01J 23/58 | (2006.01) |
| B01J 8/00 | (2006.01) |
| B01J 8/02 | (2006.01) |
| B01D 47/00 | (2006.01) |
| B01D 53/34 | (2006.01) |
| B01D 53/56 | (2006.01) |
| B01D 53/94 | (2006.01) |
| B01D 53/14 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01B 31/18 | (2006.01) |
| C01G 28/00 | (2006.01) |
| C01G 30/00 | (2006.01) |
| C01G 43/00 | (2006.01) |
| C01G 56/00 | (2006.01) |
| C10K 1/00 | (2006.01) |
| C01F 13/00 | (2006.01) |
| C01F 15/00 | (2006.01) |

(52) U.S. Cl. ........ 502/325; 502/326; 502/330; 423/212; 423/213.2; 423/213.5; 423/246; 423/249

(58) Field of Classification Search ................. 502/325, 502/326, 330; 423/246, 249, 212, 213.2, 423/213.5
See application file for complete search history.

(56) References Cited

U.S. PATENT DOCUMENTS

| | | | |
|---|---|---|---|
| 6,190,430 B1 * | 2/2001 | Fukuoka et al. | 48/198.3 |
| 6,409,939 B1 * | 6/2002 | Abdo et al. | 252/373 |
| 6,913,738 B1 | 7/2005 | Echigo et al. | |
| 7,067,453 B1 * | 6/2006 | Ming et al. | 502/304 |
| 7,247,592 B2 * | 7/2007 | Echigo et al. | 502/53 |
| 7,544,634 B2 * | 6/2009 | Echigo et al. | 502/325 |
| 7,658,908 B2 * | 2/2010 | Echigo et al. | 423/650 |
| 2003/0012719 A1 * | 1/2003 | Roos et al. | 423/247 |

FOREIGN PATENT DOCUMENTS

JP   11-086892 A   3/1999

(Continued)

OTHER PUBLICATIONS

Satoshi Aoyama et al., "CO Selective Oxidation Catalyst for Methanol Fuel Processor", Toyota Technical Review, vol. 48, No. 1, pp. 15, (1998).

*Primary Examiner* — Patricia L Hailey
(74) *Attorney, Agent, or Firm* — Panitch Schwarze Belisario & Nadel LLP

(57) ABSTRACT

Disclosed in a catalyst which enables to reduce the carbon monoxide concentration in a product gas to 5 ppm by volume or less when carbon monoxide in a raw material gas containing hydrogen and carbon monoxide is selectively oxidized. The catalyst comprises a support of an inorganic oxide and ruthenium loaded thereon, and the relative loading depth X(Ru) of ruthenium in the radial direction in a redial cross-section of the catalyst satisfies the requirement defined by the following formula (1)

$$X(Ru) \geq 15 \qquad (1).$$

7 Claims, 4 Drawing Sheets

FOREIGN PATENT DOCUMENTS

| | | | |
|---|---|---|---|
| JP | 2000-262899 A | | 9/2000 |
| JP | 2001-017861 A | | 1/2001 |
| JP | 2001-212458 A | | 8/2001 |
| JP | 2001-239169 | * | 9/2001 |
| JP | 2001-239170 | * | 9/2001 |
| JP | 2001-327868 | * | 11/2001 |
| JP | 2001-327868 A | | 11/2001 |
| JP | 2002-066321 | * | 3/2002 |
| WO | 0164337 A1 | | 9/2001 |

* cited by examiner

CATALYST FOR REDUCING CARBON MONOXIDE CONCENTRATION

CROSS-REFERENCE TO RELATED APPLICATION

This application is a section 371 of International Application No. PCT/JP2007/074614, filed Dec. 17, 2007, which was published in the Japanese language on Jun. 26, 2008 under International Publication No. WO 2008/075761 A1 and the disclosure of which is incorporated herein by reference.

FIELD OF THE INVENTION

The present invention relates to catalysts for oxidizing carbon monoxide selectively in a raw material gas containing carbon monoxide and hydrogen to produce a hydrogen-rich gas. More specifically, the present invention relates to such catalysts that can reduce the carbon monoxide concentration with their improved methanation capability.

BACKGROUND OF THE INVENTION

A fuel cell has characteristics that it is high in efficiency because it can take out electric energy directly from free energy changes caused by combustion of fuel. Further, the fuel cell does not discharge any harmful substance and thus have been extended to be used for various purposes. In particular, a solid polymer electrolyte fuel cell has characteristics that it is high in power density and compact in size and operates at low temperatures.

A fuel gas for a fuel cell generally contains hydrogen as the main component. Examples of raw materials of the fuel gas include hydrocarbons such as natural gas, LPG, naphtha, and kerosene; alcohols such as methanol and ethanol; and ethers such as dimethyl ether. However, elements other than hydrogen are present in the aforesaid raw materials and thus impurities of carbon origin can not be avoided from mixing in the fuel gas to be supplied to a fuel cell.

Carbon monoxide in particular poisons a platinum-based metal used as an electrocatalyst of a fuel cell. Therefore, if carbon monoxide is present in a fuel gas, the fuel cell would not be able to obtain sufficient power-generating characteristics. In particular, a fuel cell operating at lower temperatures undergoes carbon monoxide absorption and thus is more likely to be poisoned. It is, therefore, indispensable to decrease the concentration of carbon monoxide in the fuel gas for a system using a solid polymer electrolyte fuel cell.

It is contemplated that a method, so-called "water-gas-shift reaction" wherein carbon monoxide in a reformed gas produced by reforming a raw material reacted with steam to convert them to hydrogen and carbon dioxide be used in order to reduce the concentration of carbon monoxide. However, this method can reduce the carbon monoxide concentration only down to 0.5 to 1 percent by volume. Therefore the carbon monoxide concentration having been reduced to 0.5 to 1 percent by volume by the water-gas-shift reaction is required to be further reduced.

It is contemplated to use adsorption separation and membrane separation methods in order to further reduce the carbon monoxide concentration. However, these methods can provide high purity hydrogen but have problems that they are not suitable for actual use because the apparatuses for these methods are high in cost and large in size.

Whereas, it can be said that a method chemically reducing the carbon monoxide concentration does not encounter the above problems and thus is more realistic. Examples of such chemical methods include methanation of carbon monoxide and conversion of carbon monoxide to carbon dioxide by oxidation. Alternatively, a two-step method has been proposed, in which carbon monoxide is methanated at the first step and then oxidized at the second step (see Japanese Patent Application Laid-Open Publication No. 11-86892).

DISCLOSURE OF THE INVENTION

However, mere methanation of carbon monoxide causes loss of hydrogen that will be used as fuel for a fuel cell and thus is not appropriate in view of efficiency. The aforesaid two-step method can not avoid loss of hydrogen at the first step. Therefore, it is adequate to employ a method wherein carbon monoxide is converted to carbon dioxide by oxidation. The point of this method is how a trace or small amount of carbon monoxide mixed in hydrogen present in an enormously excess amount is selectively oxidized and methanated to reduce the carbon monoxide concentration in the resulting product gas.

As the results of extensive studies of a catalyst that selectively oxidizes carbon monoxide in a raw material gas containing hydrogen and carbon monoxide to reduce the carbon monoxide concentration therein such that a hydrogen-rich gas can be produced efficiently, the present invention was achieved on the basis of the finding that control of the loading depth and concentration profile of ruthenium in a catalyst along the radial direction in the cross-section of the catalyst was able to improve the methanation capability of the catalyst and thus reduce the carbon monoxide concentration in the resulting product gas.

That is, the present invention relates to a catalyst used in a method for reducing the carbon monoxide concentration of a raw material gas containing hydrogen and carbon monoxide by bringing the raw material gas into contact with an oxygen-containing gas in the presence of the catalyst to oxidize selectively carbon monoxide in the raw material gas, comprising a support of an inorganic oxide and ruthenium loaded thereon, the relative loading depth of ruthenium X(Ru) in the radial direction of the catalyst in a radial cross-section of the catalyst satisfying the requirement represented by the following formula (1):

$$X(Ru) \geq 15 \quad (1)$$

wherein the relative depth of ruthenium X(Ru) indicates the ratio (%) Of the loading depth of ruthenium to the radius of the catalyst particle.

The present invention also relates to the foregoing catalyst wherein when the cross-section thereof cut through a plane along the radial direction is line-analyzed using EPMA to determine the concentration level Y1 at the position where the ruthenium concentration is maximum, the position P1 where the ruthenium concentration is 5 percent of Y1, the outermost surface of the catalyst P0, and the midpoint Pm between P0 and P1, the maximum ruthenium concentration level Y2 in the area between Pm and P1 and Y1 satisfy the requirement defined by the following formula:

$$1.1 \leq Y1/Y2 \leq 10 \quad (3).$$

The present invention also relates to the foregoing catalyst wherein the inorganic oxide is at least one type selected from the group consisting of aluminum oxide, silicon oxide, zirconium oxide and titanium oxide.

The present invention also relates to the foregoing catalyst wherein in addition to ruthenium, the catalyst further comprises at least one metal selected from the group consisting of platinum, palladium, gold, silver, rhodium and iridium.

The present invention also relates to a method for reducing carbon monoxide concentration, comprising bringing a raw material gas containing hydrogen and carbon monoxide into contact with an oxygen-containing gas in the presence of the catalyst defined in claim 1 to reduce the carbon monoxide concentration in the raw material gas to 5 ppm by volume or less.

The present invention also relates to a method for reducing carbon monoxide concentration, comprising bringing a raw material gas containing hydrogen and carbon monoxide into contact with an oxygen-containing gas in the presence of the catalyst defined in claim 2 to reduce the carbon monoxide concentration in the raw material gas to 3.5 ppm by volume or less.

The present invention also relates to an apparatus for producing a hydrogen-rich gas by reducing the carbon monoxide concentration in the raw material gas using any of the forgoing methods.

The present invention also relates to a fuel cell system wherein the hydrogen-rich gas produced with the foregoing apparatus is supplied as a fuel for the cathode.

EFFECTS OF THE INVENTION

According to the present invention, the carbon monoxide concentration in a product gas can be extremely reduced since a catalyst comprising ruthenium with the controlled loading depth and concentration profile of ruthenium along the radial direction in the cross-section of the catalyst to improve the methanation capability of the catalyst is used to reduce the carbon monoxide concentration in a raw material gas containing hydrogen and carbon monoxide by bringing the raw material gas into contact with an oxygen-containing gas in the presence of the catalyst to oxidize selectively carbon monoxide in the raw material gas.

BEST MODE FOR CARRYING OUT THE INVENTION

The present invention will be described in more detail below.

The present invention provides a catalyst that oxidizes selectively carbon monoxide in a raw material gas containing hydrogen and carbon monoxide to reduce the carbon monoxide concentration in the raw material gas so that a hydrogen-rich gas can be produced efficiently.

The catalyst of the present invention comprises at least a support of an inorganic oxide and ruthenium loaded thereon, wherein the relative loading depth of ruthenium $X(Ru)$ along the radial direction in a radial cross-section of the catalyst satisfies the requirement defined by the following formula (1):

$$X(Ru) \geq 15 \quad (1)$$

wherein the relative depth of ruthenium $X(Ru)$ indicates the ratio of the loading depth of ruthenium to the radius of the catalyst particle on percentage (%).

Figure 1:
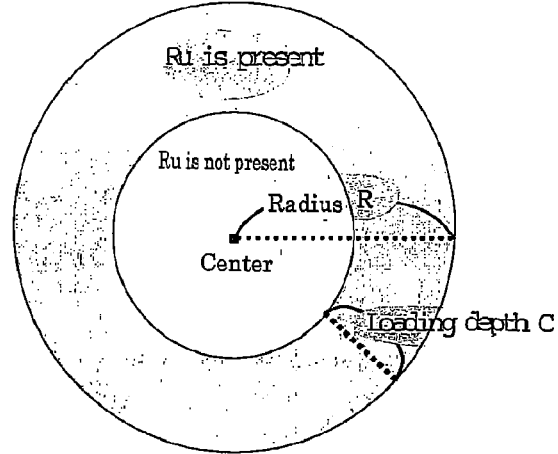
FIG. 1 is a cross-sectional view of a catalyst cut through a plane along the radial direction of the catalyst.

FIG. 1 is a schematic cross-sectional view of an example of the catalyst of the present invention, cut through a plane along the radial direction of the catalyst.

The term "loading depth of ruthenium" used herein denotes a distance from the outermost surface of the catalyst up to a certain position where ruthenium is present, in the radial direction of the catalyst. The term "certain position" used herein denotes a position where the ruthenium concentration level is 1 percent of the level at the position where the ruthenium concentration level is maximum, according to line-analysis using EPMA.

The term "relative loading depth of ruthenium" used herein denotes the value representing the ratio of the ruthenium loading depth to the radius of the catalyst on percentage (%). That is, when the radius of the catalyst is R, the loading depth of ruthenium is C, and the relative loading depth of ruthenium is $X(Ru)$, the relative loading depth of ruthenium means $X(Ru)=C/R$. When ruthenium is present from the outermost surface of the catalyst to the center thereof, $X(Ru)=100$ (%).

In the present invention, the methanation capability of the catalyst is improved by controlling the relative loading depth of ruthenium $X(Ru)$ so as to satisfy the aforesaid formula (1), and as the result, the catalyst can reduce the carbon monoxide concentration in the product gas to 5 ppm by volume or less.

On the other hand, if the requirement defined by formula (1) is not satisfied, it can not be said that the catalyst is sufficient in its selective carbon monoxide oxidation capability or methanation capability. The carbon monoxide concentration in the product gas would exceed 5 ppm by volume.

The term "high methanation capability" herein denotes that the capability to reduce the CO concentration in the product gas by forming methane as the result of reaction of carbon monoxide and hydrogen in the raw material gas as indicated by the following formula (2) is high:

$$CO + 3H_2 \rightarrow CH_4 + H_2O \quad (2).$$

Further in the present invention, the methanation capability of the catalyst is further improved by controlling the ruthenium concentration profile in the catalyst thereby reducing the carbon monoxide concentration in the product gas to 3.5 ppm by volume or less.

Figure 2:
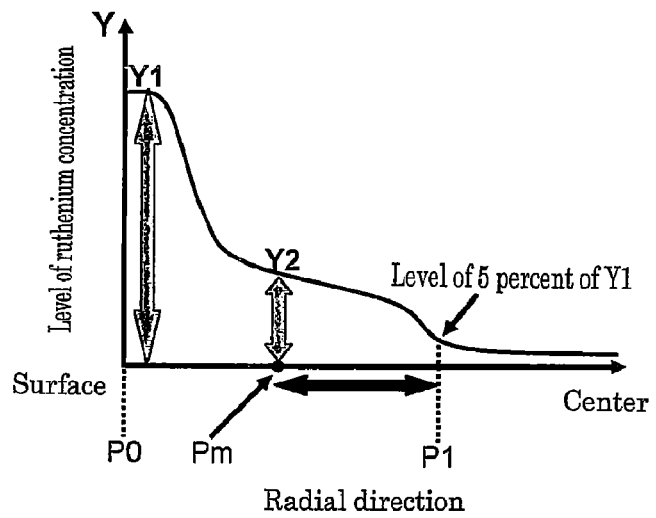
FIG. 2 is a schematic view showing the results of line analysis of the cross-section of a catalyst cut through a plane along the radial direction of the catalyst using EPMA.

FIG. 2 is a schematic view illustrating an example of a catalyst with a suitable ruthenium concentration profile in the radial direction of the catalyst and shows the ruthenium concentration profile on a plane along the radial direction of the catalyst.

First of all, the cross-section of the catalyst cut along the radial direction is line-analyzed using EPMA to measure the level of the ruthenium concentration at a certain position and seek the level Y1 at the position where the ruthenium concentration level is maximum, and then the position P1 where the level is 5 percent of Y1 is determined. Thereafter, the outermost surface position of the catalyst is defined as P0, and then the midpoint Pm between P0 and P1 is determined. In the area between Pm and P1, the level Y2 where the ruthenium concentration is maximum is determined.

The catalyst of the present invention is controlled such that Y1 and Y2 satisfy the requirement defined by formula (3) below and thus further improved in methanation capability, and as the result can reduce the carbon monoxide concentration in a product gas to 3.5 ppm by volume or less:

$$1.1 \leq Y1/Y2 \leq 10 \quad (3).$$

The inorganic oxide used as the support of the catalyst of the present invention is preferably an inorganic oxide containing at least one type selected from the group consisting of aluminum oxide (α-alumina, γ-alumina), silicon dioxide (silica), zirconium oxide (zirconia) and titanium oxide (titania). Amongst, preferred is γ-alumina because its large surface area and high affinity with Ru.

There is no particular restriction on the shape or size of or method for forming the support. When the support is shaped, the formability may be enhanced by adding a suitable binder.

In the present invention, the support is preferably in the shape of sphere or cylinder. The radius used herein denotes the radius when the support is spherical and the radius of the cross-section cut through a plane parallel to the bottom surface when the support is cylindrical. The spherical or cylindrical shape include those strictly defined as spherical or cylindrical and those part of which is deformed but the whole of which can substantially regarded as spherical or cylindrical. Even when the support is in a shape other than sphere or cylinder, the carbon monoxide concentration in the product gas can be reduced to 5 ppm by volume or less by controlling the relative ruthenium loading depth similarly to the case where the support is spherical or cylindrical to improve the methanation capability. Further, control of the ruthenium concentration profile in the radial direction can reduce the carbon monoxide concentration in a product gas to 3.5 ppm by volume or less.

There is no particular restriction on the average pore diameter of the support that is spherical. However, the average pore diameter is preferably smaller than 6 nm.

Although ruthenium is loaded as an active metal on the support, at least one metal selected from the group consisting of platinum (Pt), palladium (Pd), gold (Au), silver (Ag), rhodium (Rh) and iridium (Ir) may also be loaded on the support. In this case, Pt or Ag is preferable because oxidation of carbon monoxide is likely to proceed, and Ag is more preferable.

Preferable examples of the catalyst used in the present invention include those comprising a support of aluminum oxide and ruthenium loaded thereon, those comprising such a support and ruthenium and platinum loaded thereon, and those comprising such a support and ruthenium and silver loaded thereon.

There is no particular restriction on the amount of a metal to be loaded on a support. However, the amount is preferably from 0.01 to 10 percent by mass, particularly preferably from 0.03 to 3 percent by mass of the support. An amount of less than 0.01 percent by mass is not preferable because CO selective oxidization that is one of the catalyst functions may be not be obtained sufficiently. An amount of more than 10 percent by mass is not also preferable because methanation reaction of carbon monoxide in the raw material gas proceeds with accelerating speed. There is no particular restriction on the method for loading a metal on a support. Therefore, an impregnation method using a metal solution dissolving a metal salt of metal to be loaded on a support in a solvent, an equilibrium adsorption method, and a competitive adsorption method are preferably employed. There is no particular restriction on the number of loading times. During the loading step, all the metals are preferably supported at the same time or in numbers. There is no particular restriction on the solvent used for the metal solution as long as it can dissolve a metal salt. Preferred are water and ethanol.

There is no particular restriction on the metal salt as long as it is dissolved in the solvent. For Ru, preferred are $RuCl_3 \cdot nH_2O$, $Ru(NO_3)_3$, $K_2(RuCl_5(H_2O))$, $(NH_4)_2RuCl_6$, $(Ru(NH_3)_6)Br_3$, $Ru(NH_3)_6Cl_3$, $Na_2RuO_4$, $K_2RuO_4$, $Ru(CO)_5$, $[Ru(NH_3)_5Cl]Cl_3$, $Ru_3(CO)_{12}$ and $Ru(C_5H_7O_2)_2$. For Pt, preferred are $PtCl_2$, $K_2PtCl_4$, $K_2PtCl_6$, $H_2PtCl_6$, $(NH_4)_2PtCl_6$, $H_2Pt(OH)_6$, $Pt(NH_3)_4Cl_2 \cdot H_2O$ and $Pt(C_5H_7O_2)$. For Pd, preferred are $Na_2PdCl_6 \cdot nH_2O$, $(NH_4)_2PdCl_6$, $Pd(NH_3)_4Cl_2 \cdot H_2O$ and $Pd(C_2H_5CO_2)_2$. For Au, preferred are $AuBr_3$, $AuCl_3$, $KauBr_4$ and $Au(OH)_3$. For Ag, preferred are $AgNO_3$, $AgCl$, $AgCl_2$, $Ag_2SO_4$, $AgBF_4$, $AgPF_6$, $Ag(CF_3SO_3)$ and $Ag(CH_3COO)_2$. For Rh, preferred are $Na_3RhCl_6$, $RhCl_3 \cdot nH_2O$, $[Rh(NH_3)_5Cl]Cl_3$, $Rh(NO_3)_3$ and $Rh(C_5H_7O_2)_2$. For Ir, preferred are $Na_2IrCl_6 \cdot nH_2O$, $Na_2IrBr_6$, $[Ir(NH_3)_5Cl]Cl_3$, $IrCl_4 \cdot nH_2O$ and $Ir(C_5H_7O_2)_3$. Even for the same type of metal, a plurality of metal salts may be mixed.

After a metal is loaded on a support, it is necessary to remove the solvent. There may be employed natural drying in the air, heat drying or deaeration drying under reduced pressure. After drying, a high-temperature treatment is preferably carried out. In this case, the treatment is preferably carried out at a temperature of 300 to 800° C. for 1 to 5 hours. Although chloride ions of the support or metal salts origin may remain in the resulting catalyst, the concentration of the remaining chloride ions needs to be 100 ppm by mass or less, preferably 80 ppm by mass or less, particularly preferably 50 ppm by mass or less. If the chloride ion concentration exceeds 100 ppm by mass, the loaded metal is facilitated to agglomerate, resulting in a reduction in CO selective oxidation activity. When the catalyst prepared in the above-described method is put in use, it is usually subjected to hydrogen reduction for a pretreatment. The conditions for hydrogen reduction are those wherein the temperature is form 100 to 800° C., preferably from 150 to 250° C. and the time is from 1 to 5 hours, preferably from 1 to 3 hours.

In the present invention, the carbon monoxide concentration in a raw material gas containing hydrogen and carbon monoxide is reduced by bringing the raw material gas into contact with an oxygen-containing gas in the presence of the catalyst of the present invention to oxidize selectively carbon monoxide in the raw material gas.

The raw material gas containing hydrogen and carbon monoxide may be a gas containing mainly hydrogen produced by reforming a hydrocarbon or an oxygen-containing hydrocarbon such as alcohol or ether that is usually used as the starting material (crude fuel) of a fuel gas for a fuel cell by various methods. The crude fuel may be any of natural gas, LPG, naphtha, kerosene, gasoline or various fractions corresponding thereto, a hydrocarbon such as methane, ethane, propane and butane, various alcohols such as methanol and ethanol, and ethers such as dimethyl ether.

There is no particular restriction on the method for reforming the crude fuel. Examples of the method include steam-reforming, partial oxidation reforming and autothermal reforming. Any of these methods may be employed in the present invention.

If a crude fuel containing sulfur is supplied to the reforming step as it is, the reforming catalyst fails to exhibit its activity and shortened in working life because it is poisoned with sulfur. Therefore, prior to reforming, the crude fuel is preferably desulfurized. The conditions for desulfurization can not be determined with certainty because they vary in the state or sulfur content of the crude fuel. However, the reaction temperature is preferably from room temperature to 450° C., particularly preferably from room temperature to 300° C. The reaction pressure is preferably from atmospheric pressure to 1 MPa, particularly preferably from atmospheric pressure to 0.2 MPa. The SV is preferably from 0.01 to 15 $h^{-1}$, more preferably from 0.05 to 5 $h^{-1}$, particularly preferably from 0.1 to 3 $h^{-1}$ when the crude fuel is liquid. When a gaseous crude fuel is used, the SV is preferably from 100 to 10,000 $h^{-1}$, more preferably from 200 to 5,000 $h^{-1}$, particularly preferably from 300 to 2,000 $h^{-1}$.

The reforming conditions are not necessarily restricted. However, in general the reaction temperature is preferably from 200 to 1000° C., particularly preferably from 400 to 850° C. The reaction pressure is preferably from atmospheric pressure to 1 MPa, particularly preferably from atmospheric pressure to 0.2 MPa. The SV is preferably from 0.01 to 40 $h^{-1}$, particularly preferably from 0.1 to 10 $h^{-1}$. The gas produced by reforming reaction (reformed gas) contains hydrogen as the main component and also other components such as carbon monoxide, carbon dioxide and steam.

The above-described reformed gas may be directly used as the raw material gas in the present invention. However, the reformed gas may be used after being subjected to a pretreatment to reduce the carbon monoxide concentration to a certain extent. The pretreatment may be a method wherein carbon monoxide in the reformed gas is reacted with steam to be converted to hydrogen and carbon monoxide, so-called water-gas-shift reaction. Examples of pretreatments other than water-gas-shift reaction include methods for separating carbon monoxide by adsorption or with a membrane.

In the present invention, the raw material gas is preferably a reformed gas having been subjected to water-gas-shift reaction in order to reduce carbon monoxide and increase hydrogen in the reformed gas thereby reducing the carbon monoxide concentration more efficiently. The water-gas-shift reaction is not necessarily restricted on its reaction conditions depending on the composition of the reformed gas. However, generally the reaction temperature is preferably from 120 to 500° C., particularly preferably from 150 to 450° C. The reaction pressure is preferably from atmospheric pressure to 1 MPa, particularly preferably from atmospheric pressure to 0.2 MPa. The space velocity (SV) is preferably from 100 to 50,000 $h^{-1}$, particularly preferably from 300 to 10,000 $h^{-1}$.

The carbon monoxide concentration in the raw material gas is usually from 0.1 to 2 percent by volume. Whereas, the hydrogen concentration in the raw material gas is usually from 40 to 85 percent by volume. The raw material gas may contain nitrogen and carbon dioxide in addition to carbon monoxide and hydrogen.

There is no particular restriction on the oxygen-containing gas. Examples of the gas include air and oxygen. There is no particular restriction on the molar ratio of oxygen in the oxygen-containing gas to carbon monoxide in the raw material gas. For example, the molar ratio is preferably within the range of 0.5 to 2.5 when the carbon monoxide concentration in the raw material gas is 0.5 percent by volume. If the molar ratio is smaller than 0.5, the oxidization reaction of oxygen with carbon monoxide tends not to proceed sufficiently due to lack of oxygen in stoichiometric sense. If the molar ratio is larger than 2.5, a reduction in hydrogen concentration due to oxidation reaction of hydrogen, an increase in reaction temperature due to heat caused by oxidation of hydrogen and a side reaction such as methane formation likely occur.

When a raw material gas containing hydrogen and carbon monoxide is brought into contact with an oxygen-containing gas in the presence of the catalyst of the present invention to oxidize selectively carbon monoxide, the reaction pressure is preferably from atmospheric pressure to 1 MPa, particularly preferably from atmospheric pressure to 0.2 MPa in consideration to the economical efficiency and safety of a fuel cell. There is no particular restriction on the reaction temperature as long as it is such that the carbon monoxide concentration is reduced. A too low reaction temperature causes a too slow reaction while a too high reaction temperature causes a reduction in selectivity. Therefore, the reaction temperature is preferably from 80 to 350° C., particularly preferably from 100 to 300° C. An excessively too high GHSV causes the oxidation reaction of carbon monoxide to unlikely proceed. A too low GHSV causes an apparatus to be too large. Therefore, the GHSV is preferably from 1,000 to 50,000 $h^{-1}$, particularly preferably from 3,000 to 30,000 $h^{-1}$.

Figure 3:
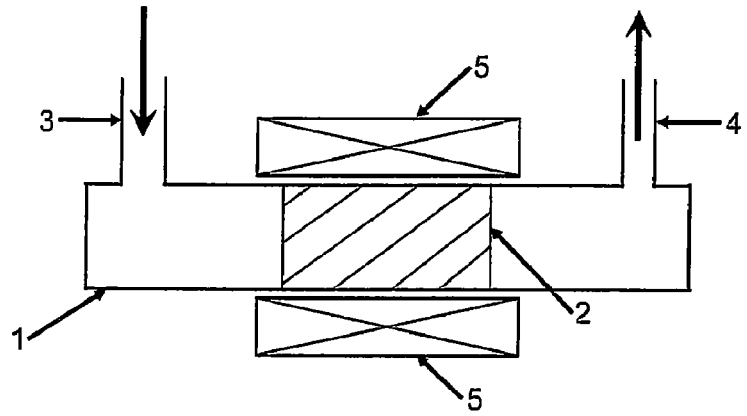
FIG. 3 is a schematic cross-sectional view showing an example of a reaction unit used to evaluate the selective oxidation capability of a catalyst and produce a hydrogen-rich gas.

FIG. 3 is a schematic cross-sectional view showing an examples of a reaction unit suitably used to evaluate the selective oxidation capability of a catalyst according to the present invention and produce a hydrogen-rich gas. The reaction unit shown in FIG. 3 is a fixed-bed circulation type reaction unit. FIG. 3 is a cross-section view of the reaction unit cut through a plane along the direction of circulation of gas.

In the reaction unit shown in FIG. 3, a reaction vessel 1 is filled with a catalyst, and a gas inlet pipe 3 and a gas outlet pipe 4 are provided on the upstream and downstream sides, respectively. At a position around the outer periphery corresponding to the position of the catalyst layer in the unit is arranged a heater 5 for heating the layer.

From the gas inlet pipe 3 are supplied a raw material gas containing hydrogen and carbon monoxide and an oxygen-containing gas.

As described above, in the method for oxidizing selectively carbon monoxide by bringing a raw material gas containing hydrogen and carbon monoxide and an oxygen-containing gas into contact with the catalyst, the carbon monoxide concentration in the resulting product gas can be reduced to 5 ppm by volume or less using a catalyst with a ruthenium loading depth controlled such that the requirement defined by formula (1) above is satisfied due to the high methanation capability of the catalyst. The carbon monoxide concentration in the product gas can be reduced to 3.5 ppm by volume or less by controlling the ruthenium concentration profile in the radial direction such that the above-described Y1/Y2 satisfies the requirement defined by formula (3) above. Therefore, the resulting hydrogen-rich gas (or high purity hydrogen-containing gas) is effective in restraining the noble metal-based catalysts used in electrodes in a fuel cell from being poisoned or deteriorating and also useful in keeping the working life of the fuel cell long while keeping the power generation efficiency high.

Next, a description will be given of a fuel cell system to which a method for producing a hydrogen-rich gas using a catalyst according to the present invention is applied.

Figure 4:
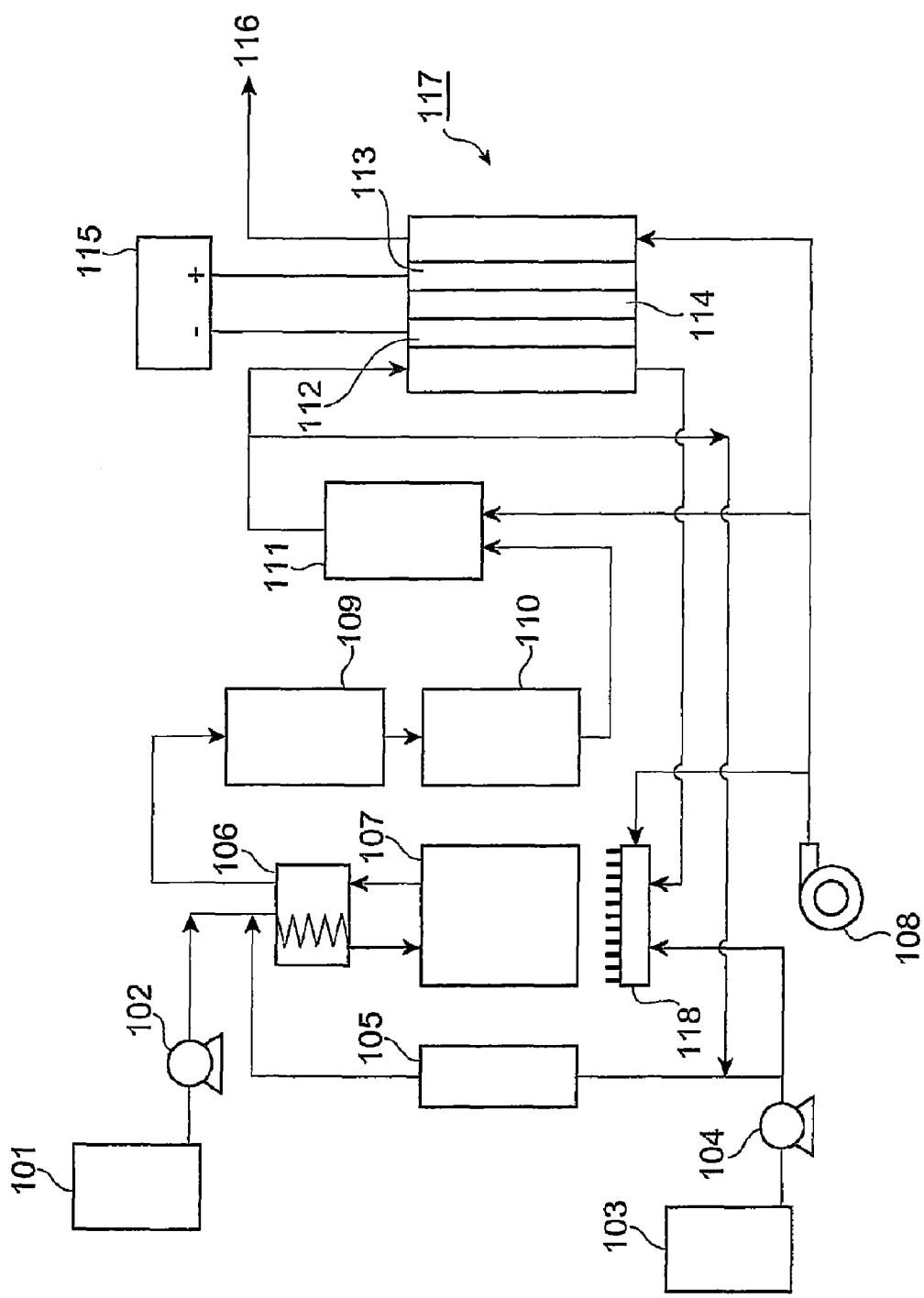
FIG. 4 is a schematic view showing an example of a fuel cell system.

FIG. 4 is a schematic view illustrating an preferable example of a fuel cell system according to the present invention. In the fuel cell system in FIG. 4, a crude fuel in a fuel tank 103 flows through a fuel pump 104 into a desulfurizer 105. Thereupon, if necessary, a hydrogen-containing gas may be added from a carbon monoxide selective oxidation reactor 111. The desulfurizer 105 may be filled with a copper-zinc-based or nickel-zinc-based adsorbent. The fuel having been desulfurized in the desulfurizer 105 is mixed with water supplied through a water pump 102 from a water tank 101 and then introduced into a vaporizer 106 and fed into a reformer 107.

The reformer 107 is warmed with a warming burner 118. The anode offgas from a fuel cell 117 is used as the fuel for the warming burner 18. However, if necessary, the fuel pumped out from the fuel pump 104 may be used to replenish the burner fuel. A catalyst to be filled in the reformer 107 may be a nickel-, ruthenium-, or rhodium-containing catalyst. The raw material gas containing hydrogen and carbon monoxide produced in this manner is reformed in a high-temperature shift reactor 109 and a low-temperature shift reactor 110. The high-temperature shift reactor 109 is filled with an iron-chrome-containing catalyst while the low-temperature shift reactor is filled with a copper-zinc-containing catalyst.

The raw material gas produced through the high-temperature and low-temperature shift reactors 109, 110 are then directed to the selective oxidation reactor 111. The selective oxidation reactor 111 is filled with the catalyst of the present invention. The raw material gas is mixed with air supplied from an air blower 108 and selective-oxidized in the presence of the catalyst in the selective oxidation reactor. With this method, the carbon monoxide concentration in the raw material gas is reduced to such an extent that the characteristics of a fuel cell are not adversely affected.

A solid polymer fuel cell 17 comprises an anode 112, a cathode 113, and a solid polymer electrolyte 114. To the anode and cathode are introduced the fuel gas containing high purity hydrogen produced by the above-described method and air supplied from an air blower, respectively. The fuel gas and air may be introduced if necessary after being subjected to an appropriate humidifying treatment (no humidifying device is shown). Thereupon, a reaction wherein the hydrogen gas becomes protons and releases electrons proceeds at the anode while a reaction wherein the oxygen gas obtains electrons and protons and thus becomes water proceeds at the cathode. In order to facilitate these reactions, platinum black and a Pt or Pt—Ru alloy catalyst with an active carbon support are used for the anode while platinum black and a Pt catalyst with an active carbon support are used for the cathode. Generally, if necessary, both of the catalysts of the anode and the cathode are formed into porous catalyst layers, together with tetrafluoroethylene, a low molecular weight polymer electrolyte membrane material, and active carbon.

Next, the porous catalyst layers are laminated on the both sides of a polymer electrolyte membrane known as product names such as Nafion (Du Pont Kabushiki Kaisha), Gore (JGI), Flemion (ASAHI GLASS CO., LTD.) or Aciplex (Asahikasei Corporation) thereby forming an MEA (Membrane Electrode Assembly). Further, the MAE is sandwiched by a pair of separators comprising a metal material, graphite, a carbon composite and having a gas feed function, a current collecting function and a draining function which is important in particular for the cathode, to assemble a fuel cell. An electric load 115 is electrically connected to the anode and the cathode. The anode offgas is spent in the humidifying burner 118 while the cathode offgas is discharged from an exhaust 116.

EXAMPLES

Hereinafter, the present invention will be described in more details by way of the following examples and comparative examples, which should not be construed as limiting the scope of the invention.
(Preparation of Catalyst A)
A commercially available γ-alumina support (average pore diameter: 5.0 nm) was impregnated with ruthenium chloride in an amount of 0.5 percent by mass in terms of metal Ru, and then dried to remove the moisture and reduced thereby producing a $Ru/Al_2O_3$ catalyst (catalyst A).

Catalysts varied in the Ru loading depth and concentration profile were produced using catalyst A and referred to as catalyst A1, catalyst A2, catalyst A3, catalyst A4, catalyst A5 and catalyst A6.
(Preparation of Catalyst B)
A commercially available γ-alumina support (average pore diameter: 7.0 nm) was impregnated with ruthenium chloride in an amount of 0.5 percent by mass in terms of metal Ru, and then dried to remove the moisture and reduced thereby producing a $Ru/Al_2O_3$ catalyst (catalyst B).
(Preparation of Catalyst C)
A commercially available γ-alumina support (average pore diameter: 5.0 nm) was impregnated with ruthenium chloride in an amount of 0.5 percent by mass in terms of metal Ru and chloroplatinic acid in an amount of 0.02 percent by mass in terms of metal Pt, and then dried to remove the moisture and reduced thereby producing a $Ru/Pt/Al_2O_3$ catalyst (catalyst C).
(Preparation of Catalyst D)
A commercially available γ-alumina support (average pore diameter: 5.0 nm) was impregnated with ruthenium chloride in an amount of 0.5 percent by mass in terms of metal Ru and silver nitrate in an amount of 0.02 percent by mass in terms of metal Ag, and then dried to remove the moisture and reduced thereby producing a $Ru/Ag/Al_2O_3$ catalyst (catalyst D).
(Selective Oxidation Reaction of Carbon Monoxide)
Each of the catalysts prepared above was filled into the reaction unit shown in FIG. 3 and hydrogen-reduced for pretreatment at a temperature of 200° C. for one hour.

Thereafter, a raw material gas containing hydrogen ($H_2$), carbon monoxide (CO), carbon dioxide ($CO_2$) and steam ($H_2O$) and an air as an oxygen-containing gas were supplied to the catalyst layer so as to carry out a selective oxidation reaction of carbon monoxide in the raw material gas. The reaction conditions were set to be such that the GHSV was 8,000 $h^{-1}$ and the reaction temperature (catalyst layer inlet temperature) was 140° C. The composition of the raw material gas was adjusted to be such that $H_2$: 55.5 percent by volume, CO: 5,000 ppm by volume, $CO_2$: 24 percent by volume and $H_2O$: 20 percent by volume, and the molar ratio of the oxygen in the oxygen-containing gas to the carbon monoxide in the raw material gas was 2:1.

Figure 5:
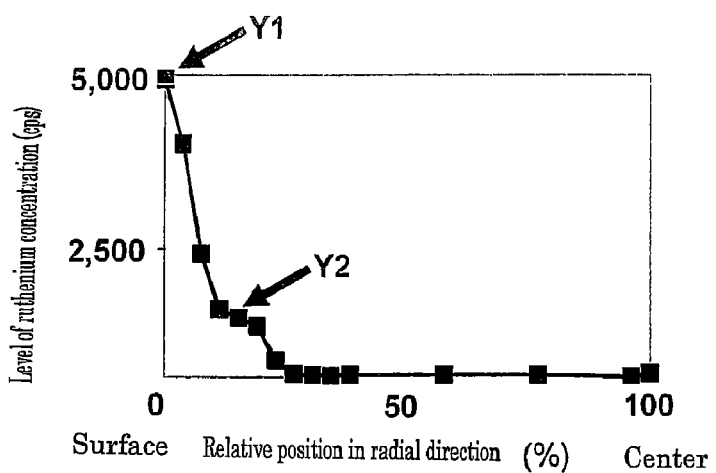
FIG. 5 is a graph showing the results of line-analysis of the cross-section of catalyst A1 used in Example 1 cut through a plane along the radial direction of the catalyst using EPMA.
Figure 6:
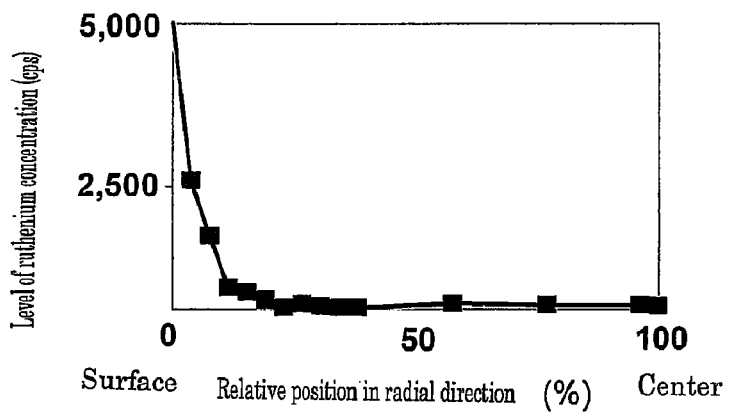
FIG. 6 is a graph showing the results of line-analysis of the cross-section of catalyst A2 used in Example 2 cut through a plane along the radial direction of the catalyst using EPMA.
Figure 7:
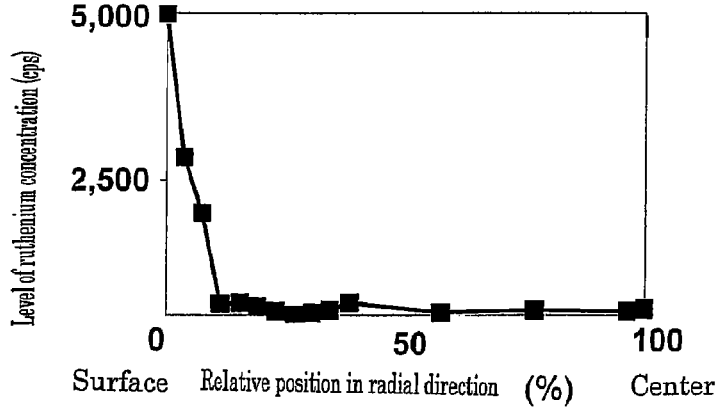
FIG. 7 is a graph showing the results of line-analysis of the cross-section of catalyst A3 used in Comparative Example 1 cut through a plane along the radial direction of the catalyst using EPMA.

In the aforementioned carbon monoxide selective oxidation reaction, the composition of the raw material gas at the downstream end of the catalyst layer was measured after the lapse of a certain period of time from the initiation of the reaction. The analysis was carried out using a TCD gas chromatography.
(Catalyst with a Controlled Ru Loading Depth)
Among catalysts A, they were referred to as catalysts A1, A2 and A3 in descending order of depth. The cross-section of each of the catalysts cut through a plane along the radial direction was line-analyzed using EPMA. The results of catalysts A1, A2 and A3 are shown in FIGS. 5, 6 and 7, respectively. The abscissa axis in each of FIGS. 5 to 7 indicates a relative position (%) in the radial direction of each catalyst. The term "relative position in the radial direction" denotes the value on percentage representing the ratio of the distance from the outermost surface of a catalyst to a certain position in the radial direction of the catalyst to the radius of the catalyst. Therefore, the outermost surface position is 0 (%) while the center is 100 (%). The ordinate indicates the levels of the ruthenium concentration at predetermined relative positions.

Example 1

As shown in FIG. 5, for catalyst A1, the relative position where ruthenium was present was from 0 to 23 percent and thus the relative loading depth of ruthenium X(Ru)=23(%). That is, it was confirmed that catalyst A1 satisfied the requirement of formula (1) above. The resulting product gas had a $CH_4$ concentration of 2,700 ppm by volume and a CO concentration of 3.2 ppm by volume. Therefore, catalyst A1 was able to reduce the CO concentration in the product gas to 5 ppm by volume or less because of its high methanation capability.

Example 2

As shown in FIG. 6, for catalyst A2, the relative position where ruthenium was present was from 0 to 15 percent and thus the relative loading depth of ruthenium X(Ru)=15(%). That is, it was confirmed that catalyst A2 satisfied the requirement of formula (1) above. The resulting product gas had a $CH_4$ concentration of 1,800 ppm by volume and a CO concentration of 3.4 ppm by volume. Therefore, catalyst A2 was able to reduce the CO concentration in the product gas to 5 ppm by volume or less because of its high methanation capability.

Comparative Example 1

As shown in FIG. 7, for catalyst A3, the relative position where ruthenium was present was from 0 to 12 percent and thus the relative loading depth of ruthenium X(Ru)=12(%). That is, it was confirmed that catalyst A2 did not satisfy the requirement of formula (1) above. The resulting product gas had a $CH_4$ concentration of 400 ppm by volume and a CO concentration of 8.6 ppm by volume. Therefore, catalyst A3 failed to reduce the CO concentration in the product gas to 5 ppm by volume or less because of its insufficient methanation capability.

As described above, the use of a catalyst with a ruthenium loading depth controlled such that X(Ru) satisfies the requirement defined by formula (1) enables selective oxidation of carbon monoxide to be carried out efficiently. Further, it was confirmed that the catalyst was able to reduce the carbon monoxide concentration to 5 ppm by volume or less because of its high methanation capability.

(Catalysts with a Controlled Ru Concentration Profile in the Radial Direction)

Figure 8:
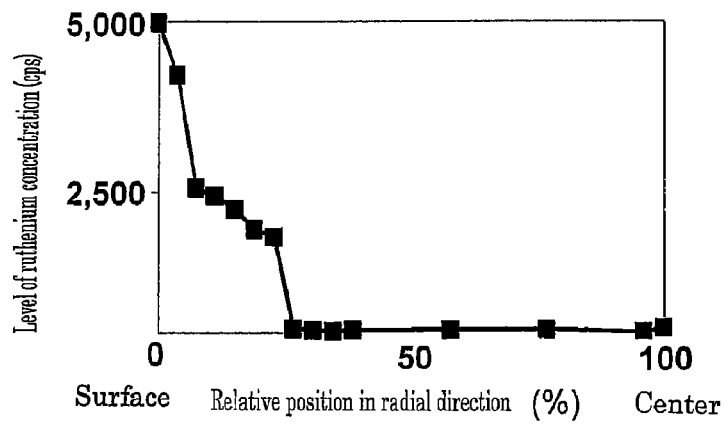
FIG. 8 is a graph showing the results of line-analysis of the cross-section of catalyst A4 used in Example 5 cut through a plane along the radial direction of the catalyst using EPMA.
Figure 9:
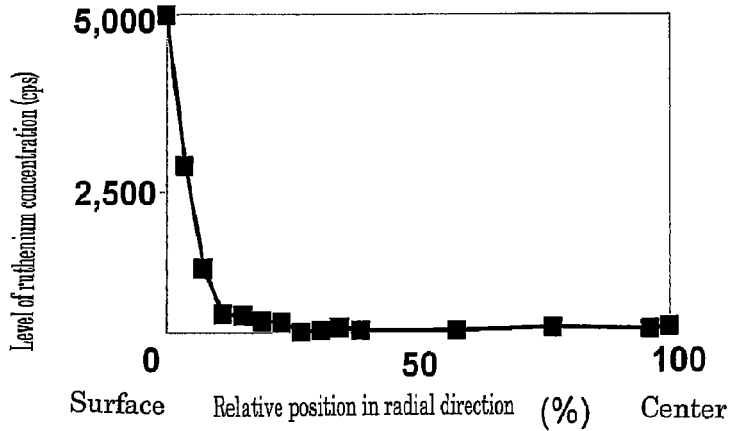
FIG. 9 is a graph showing the results of line-analysis of the cross-section of catalyst A5 used in Example 6 cut through a plane along the radial direction of the catalyst using EPMA.
Figure 10:
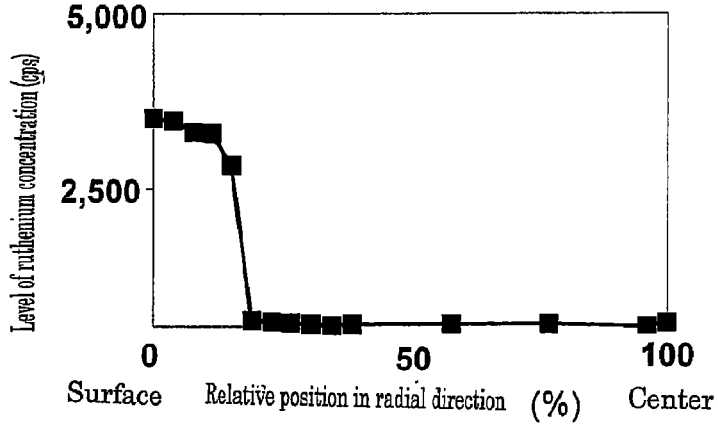
FIG. 10 is a graph showing the results of line-analysis of the cross-section of catalyst A6 used in Example 7 cut through a plane along the radial direction of the catalyst using EPMA.

Catalysts A varied in ruthenium concentration profile in the radial direction were refereed to as catalyst A4, catalyst A5 and catalyst A6. The cross-section of each of the catalysts cut through a plane along the radial direction was line-analyzed using EPMA. The results of catalysts A4, A5 and A6 are shown in FIGS. 8, 9 and 10, respectively.

Example 3

As shown in FIG. 5, for catalyst A1 of Example 1, Y1/Y2=3.3 and thus it was confirmed that catalyst A1 satisfied the requirement defined by formula (3). The resulting product gas had a $CH_4$ concentration of 2,700 ppm by volume and a CO concentration of 3.2 ppm by volume. Therefore, catalyst A1 was able to reduce the CO concentration in the product gas to 3.5 ppm by volume or less because of its high methanation capability. The results are also set forth in Table 1.

Example 4

As shown in FIG. 6, for catalyst A2 of Example 2, Y1/Y2=9.4 and thus it was confirmed that catalyst A1 satisfied the requirement defined by formula (3). The resulting product gas had a $CH_4$ concentration of 1,800 ppm by volume and a CO concentration of 3.4 ppm by volume. Therefore, catalyst A2 was able to reduce the CO concentration in the product gas to 3.5 ppm by volume or less because of its high methanation capability.

Example 5

As shown in FIG. 8, for catalyst A4, Y1/Y2=2.6 and thus it was confirmed that catalyst A4 satisfied the requirement defined by formula (3). The resulting product gas had a $CH_4$ concentration of 3,300 ppm by volume and a CO concentration of 2.8 ppm by volume. Therefore, catalyst A4 was able to reduce the CO concentration in the product gas to 3.5 ppm by volume or less because of its high methanation capability.

Example 6

As shown in FIG. 9, for catalyst A5, Y1/Y2=10.2 and thus it was confirmed that catalyst A5 did not satisfy the requirement defined by formula (3). The resulting product gas had a $CH_4$ concentration of 700 ppm by volume and a CO concentration of 4.8 ppm by volume. That is, since catalyst A5 did not satisfy the requirement defined by formula (3), it was able to reduce the CO concentration in the product gas to 5 ppm by volume or less but failed to reduce the concentration to 3.5 ppm by volume or less.

Example 7

As shown in FIG. 10, for catalyst A6, Y1/Y2=1.04 and thus it was confirmed that catalyst A6 did not satisfy the requirement defined by formula (3). The resulting product gas had a $CH_4$ concentration of 900 ppm by volume and a CO concentration of 3.9 ppm by volume. That is, since catalyst A6 did not satisfy the requirement defined by formula (3), it was able to reduce the CO concentration in the product gas to 5 ppm by volume or less but failed to reduce the concentration to 3.5 ppm by volume or less.

Comparative Example 2

The same procedures of Example 3 were repeated except for using catalyst B. The results are set forth in Table 1.

Example 8

The same procedures of Example 3 were repeated except for using catalyst C. The results are set forth in Table 1.

Example 9

The same procedures of Example 3 were repeated except for using catalyst D. The results are set forth in Table 1.

TABLE 1

| | Catalyst | X(Ru) | Y1/Y2 | CH$_4$ concentration Vol. ppm | CO concentration Vol. ppm |
|---|---|---|---|---|---|
| Example 3 | Catalyst A1 | 23 | 3.3 | 2,700 | 3.2 |
| Comparative Example 2 | Catalyst B | 12 | 11 | 1,800 | 9.8 |
| Example 8 | Catalyst C | 19 | 3.1 | 2,320 | 2.7 |
| Example 9 | Catalyst D | 21 | 2.7 | 2,490 | 2.5 |

As described above, the use of a catalyst with a ruthenium concentration profile in the radial direction controlled such that Y1/Y2 satisfies the requirement defined by formula (3) enables selective oxidation of carbon monoxide to be carried out efficiently. Further, it was confirmed that the catalyst was able to reduce the carbon monoxide concentration to 3.5 ppm by volume or less because of its high methanation capability.

APPLICABILITY IN THE INDUSTRY

The catalyst of the present invention has a great industrial value because it can reduce significantly the carbon monoxide concentration in a product gas.

The invention claimed is:

1. A catalyst used in a method for reducing the carbon monoxide concentration of a raw material gas containing hydrogen and carbon monoxide by bringing the raw material gas into contact with an oxygen-containing gas in the presence of the catalyst to selectively oxidize carbon monoxide in the raw material gas, comprising a support of an inorganic oxide and ruthenium loaded thereon, the relative loading depth of ruthenium X(Ru) in the radial direction of the catalyst in a radial cross-section of the catalyst satisfying the requirement represented by the following formula (1):

$$X(Ru) \geq 15 \tag{1}$$

wherein the relative depth of ruthenium X(Ru) indicates the ratio (%) of the loading depth of ruthenium to the radius of the catalyst particle, wherein in addition to ruthenium, the catalyst further comprises at least one metal selected from the group consisting of platinum, palladium, rhodium and iridium.

2. The catalyst according to claim 1, wherein when the cross-section thereof cut through a plane along the radial direction is line-analyzed using EPMA to determine the concentration level Y1 at the position where the ruthenium concentration is maximum, the position P1 where the ruthenium concentration is 5 percent of Y1, the outermost surface of the catalyst P0, and the midpoint Pm between P0 and P1, the maximum ruthenium concentration level Y2 in the area between Pm and P1 and Y1 satisfy the requirement defined by the following formula:

$$1.1 \leq Y1/Y2 \leq 10 \tag{3}$$

3. A method for reducing carbon monoxide concentration comprising:
bringing a raw material gas containing hydrogen and carbon monoxide into contact with an oxygen-containing gas in the presence of the catalyst according to claim 2 to reduce the carbon monoxide concentration in the raw material gas to 3.5 ppm by volume or less.

4. The catalyst according to claim 1, wherein the inorganic oxide is at least one type selected from the group consisting of aluminum oxide, silicon oxide, zirconium oxide and titanium oxide.

5. A method for reducing carbon monoxide concentration comprising:
bringing a raw material gas containing hydrogen and carbon monoxide into contact with an oxygen-containing gas in the presence of the catalyst according to claim 1 to reduce the carbon monoxide concentration in the raw material gas to 5 ppm by volume or less.

6. An apparatus for producing a hydrogen-rich gas by reducing the carbon monoxide concentration in the raw material gas using the methods according to claim 5.

7. A fuel cell system comprising a cathode, wherein the hydrogen-rich gas produced with the apparatus according to claim 6 is supplied as a fuel for the cathode.

* * * * *